Feb. 10, 1970   H. F. LONGNECKER   3,493,987
SWEEPER FOR TRACTOR
Filed July 16, 1968   2 Sheets-Sheet 1

Harry F. Longnecker
INVENTOR.

BY Stefan M. Stein
ATTORNEY

Feb. 10, 1970  H. F. LONGNECKER  3,493,987
SWEEPER FOR TRACTOR

Filed July 16, 1968  2 Sheets-Sheet 2

Harry F. Longnecker
INVENTOR.

BY  *Stefan M. Stein*
ATTORNEY

United States Patent Office 3,493,987
Patented Feb. 10, 1970

3,493,987
SWEEPER FOR TRACTOR
Harry F. Longnecker, 745 26th Ave. N.,
St. Petersburg, Fla. 33704
Filed July 16, 1968, Ser. No. 745,319
Int. Cl. E01h *1/04*
U.S. Cl. 15—83                                    7 Claims

ABSTRACT OF THE DISCLOSURE

A sweeper adapted to be attached to and supported at the rear portion of a tractor and having a rotating brush for sweeping debris from the ground and a pivotable receptacle for catching and storing the debris. The brush is rotated by a drive system which receives its power from the rear wheels of the tractor. The debris container may be emptied by pulling on a cord which extends to the tractor. Pull action inverts the receptacle to a dump position.

---

The present invention relates to a sweeper having a rotating brush, driven by the wheels of a tractor with which it is associated, for sweeping debris such as grass, leaves, etc., from the ground. The sweeper also includes a debris receptacle for catching and retaining grass being cut and/or debris being lifted by the sweeper.

Debris sweepers are usually provided with a rotating brush and a debris receiving receptacle that are mounted on a wheeled frame which is adapted to be towed, manually pushed, or self-propelled. The brush is usually driven either by a separate motor or through a connection with the wheels of the sweeper.

While sweepers with a brush driven via a connection to the wheels are effective, they occasionally slip, especially where the grass is wet or where the debris being swept is substantial. Separate motor driven sweepers are obviously uneconomical due to the need for a separate motor and gear means associated therewith to enable control.

It is an object of this invention to provide a sweeper which may be mounted upon the rear of a tractor, preferably a grass cutting tractor, without the need for additional wheel support for the sweeper itself.

Another object is to provide a sweeper of the above character which utilizes the rotary motion of the tractor's wheels to rotate the sweeper brush.

Still another object is to provide a sweeper having a vertically adjustable brush to match grass blade cutting height for controlled depth sweeping.

A further object is to provide a sweeper having a debris receiving receptacle which is easily dumped.

A still further object is to provide a sweeper which is both practical and economically feasible to manufacture.

Other objects of the invention will in part be obvious and will in part appear hereinafter.

In accordance with the above objectives, the sweeper of the invention comprises a frame adapted to be mounted easily and swiftly to a tractor in a cantilevered manner. A pair of brush drive wheels are suitably positioned on an axle rotatably mounted on the sweeper's frame such that these drive wheels bear against the wheels of a tractor by the weight of the sweeper when the sweeper is attached. At one end of the axle which carries the drive wheels there is a drive-sprocket. A drive chain connects from this sprocket to a sprocket on an axle for the sweeper brush. The brush is vertically adjustable to the height of the grass being cut by proper selection of the tractor mount brackets. Pivotally carried on an upper part of the sweeper frame is a debris receptacle having a rope attached to the frame and extending forwardly of the receptacle to the tractor. Pulling forward on the rope inverts the receptacle about its high pivot thereby enabling easy dumping of the debris.

In operation, the height of the brush from the ground is adjusted by proper selection of the tractor mounting brackets to the height of the grass being cut by the tractor, or to the ground for sweeping debris therefrom. Thus, as the tractor moves, the wheels of the tractor drive the brush drive wheels, which in turn rotate the brush to automatically sweep cut grass or debris into the receptacle.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
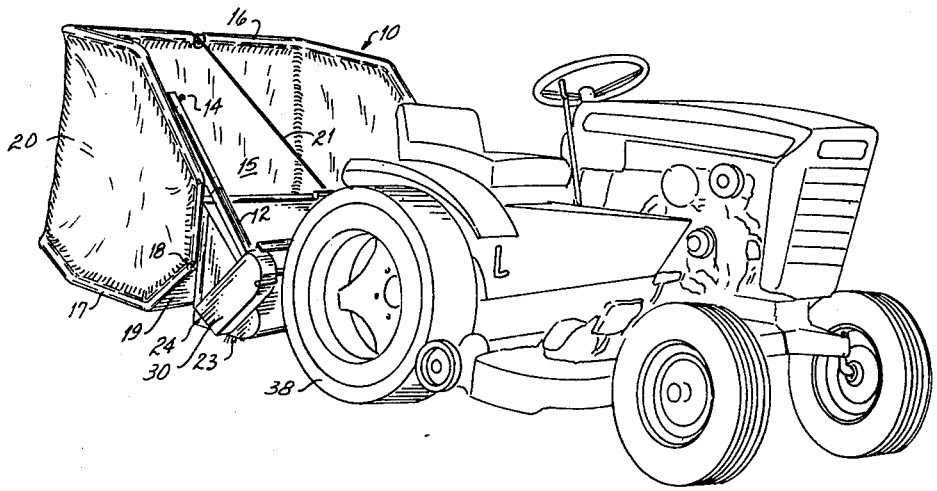
FIG. 1 is a perspective view showing the sweeper attached to a grass cutting tractor.
Figure 2:
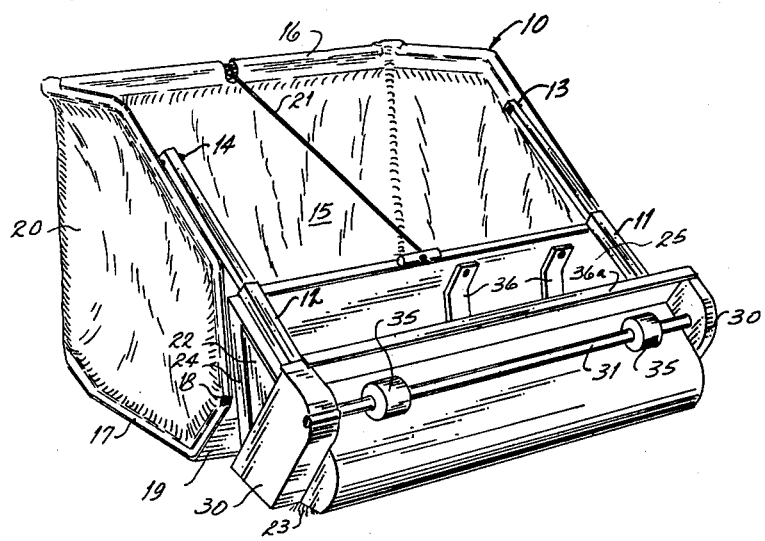
FIG. 2 is a perspective front view of the sweeper above.

Referring now to the drawings in detail, particularly FIG. 2, the sweeper, generally indicated as 10, includes two structural angularly rearward extending frame-like braces 11 and 12. Debris receptacle pivot pins 13 and 14 are affixed to the rearmost end of these braces, and a debris receptacle 15 is pivotally carried on these pins 13 and 14.

Figure 3:
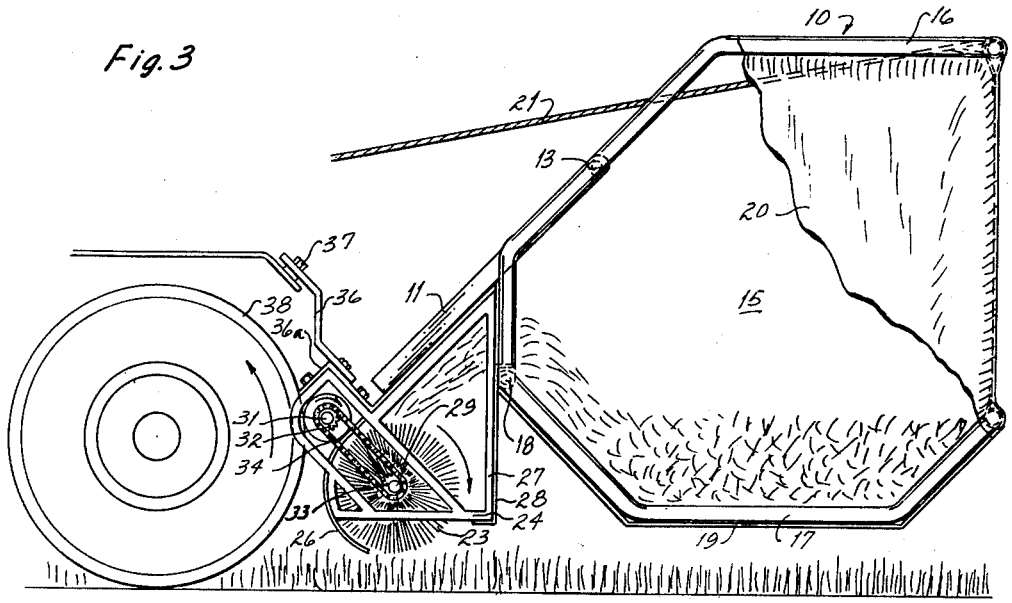
FIG. 3 is a side view, partly in section and with some of the side plates removed to show the detail of the drive means for the sweeper brush.

As best seen in FIGS. 2 and 3, debris receptacle 15 consists of an upper U-shaped tube 16 having downwardly extending arms, and a lower U-shaped tube 17 having upwardly extending arms. The arms of both tubes are connected to each other and secured by bolts 18 (only the left one of which is shown). Upper tube 16 is adapted to receive and pivotally swing on pins 13 and 14.

The entire bottom side of tube 17 has a sheet metal plate 19, conforming to the outline of the tubing affixed thereto. It acts as a tray to catch and retain debris. Attached to both tubes 16 and 17 to form a back, left and right side of the receptacle is a web material 20 such as canvas, sheet plastic or the like. The upper and front portion of tube 16 is open to receive debris and grass. Attached to the upper mid portion of tube 16 is a receptacle emptying cord or rope 21 for pivoting the receptacle 15 about pins 13 and 14.

Affixed to the lower end of braces 11 and 12 is a housing 22 for a sweeper brush 23. The housing has a pair of end frames 24 for rigidity. Its forward arcuate portion 26 conforms to the peripheral surface of brush 23 and acts as a deflector for the debris lifted by the brush to direct said debris into receptacle 15 (see FIG. 3). The lower rear vertical face 27 of frames 24 is joined by a sheet metal back cover 28. The receptacle 15 abuts against cover 28. As seen in FIG. 3, with such construction, debris is swept forwardly by the broom against plate 26 and is deflected upwardly and rearwardly into receptacle 15.

A brush drive axle 31 is located forwardly of plate 26. It is rotatably supported on frames 24. Brush axle 29 is also rotatably supported on frames 24. A sprocket 32 attached to one side of brush drive axle 31 and a sprocket 33 attached to the similar side of brush axle 29 with a drive chain 34 around both sprockets connects the drive axle 31 to the brush axle 29. A gear train or a friction wheel train may also be used. A pair of drive wheels 35 (see FIG. 2) keyed to axle 31 and positioned to ride on the wheels 38 of the tractor to which the sweeper is attached, act as the brush drive means. A housing 30 on each side covers frames 24.

A cross sweeper support brace 36a is attached to the upper portion of frames 24. Bolted to brace 36a are a pair of attaching arms 36 for attaching the sweeper to the tractor. The arms are selected of appropriate length to cause the ends of brush 23 to touch the surface desired to be swept. Alternatively the arms may be of adjustable length. In the preferred form, the body portion of the tractor contains connecting pins 37 suitably positioned to receive the free end of attaching arms 36. Quick disconnect pins are preferably utilized.

In operation, the sweeper is attached to the tractor via arms 36 and pins 37. With such attachment the weight of the sweeper is borne by the drive wheels 35 which abut against tractor wheels 38. The sweeper is thus sustained in a cantilevered position. No part of the sweeper other than the ends of the brush touches the ground. As the tractor is driven, the wheels 38 of the tractor rotate the drive wheels 35 which in turn rotate sprocket 32 on the drive axle 31. As sprocket 32 rotates, it also drives chain 34 which, in turn, rotates brush sprocket 33 and hence sweeper brush 23. The brush sweeps the debris forwardly to impinge upon debris deflecting plate 26. The debris is thereby flung upwardly into receptacle 15.

Figure 4:
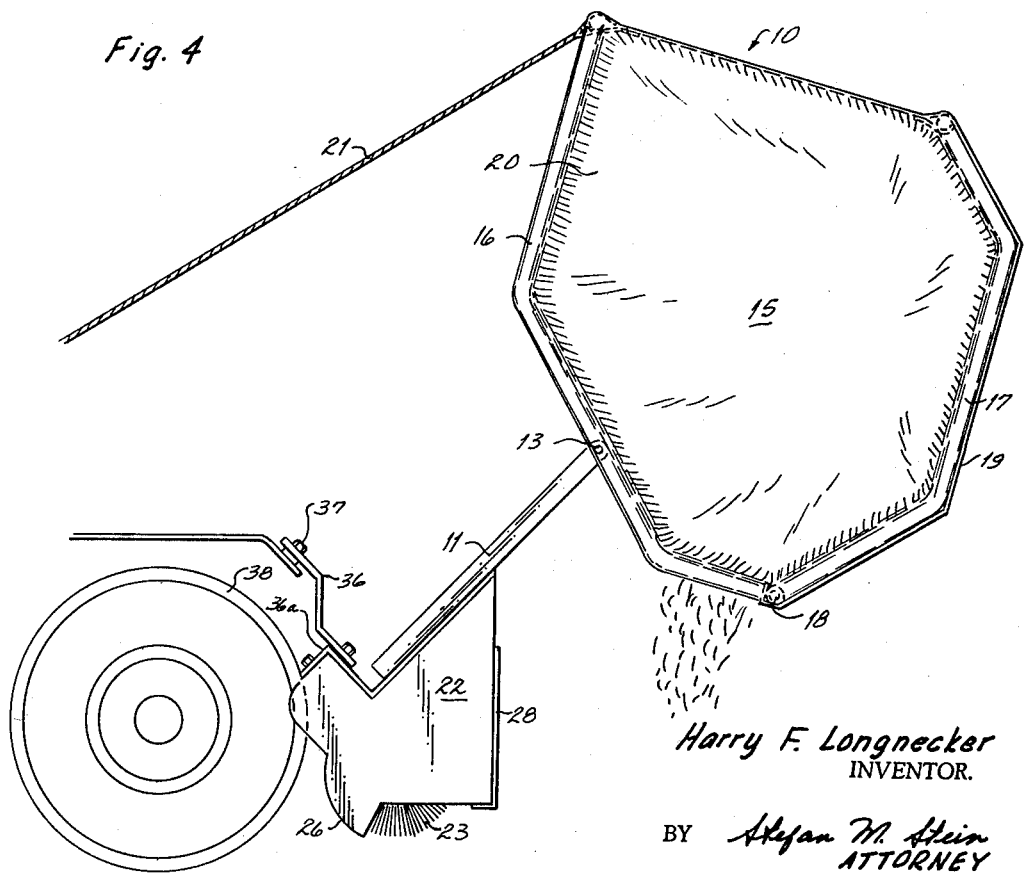
FIG. 4 is a similar side view but showing the receptacle in a dumping position.

When it is desired to dump the debris from the receptacle, the operator of the tractor drives the tractor and sweeper to the dumping area and merely pulls rope 21 forwardly. This pivots receptacle 15 about pins 13 and 14 until the receptacle is inverted to a dump position as shown in FIG. 4. The receptacle returns to its original position upon releasing the rope.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A sweeper for attachment to the back of a wheeled vehicle comprising:
   (a) two side frames,
   (b) a brush axle extending between said frames,
   (c) a debris sweeping brush carried on said brush axle,
   (d) a drive axle extending between said frames,
   (e) at least one drive wheel carried by said axle and suitably positioned on said drive axle such that the perimeter of the drive wheel bears against one rear wheel of said vehicle when said sweeper is attached to said vehicle, whereby rotation of the wheel will rotate said drive wheel and said drive axle,
   (f) drive means between said drive axle and said brush axle,
   (g) and vehicle attaching means for removably securing said sweeper to said vehicle in a cantilevered position with said drive wheel against said wheel of said vehicle and with no portion of the sweeper touching the ground except the peripheral surface of the debris sweeping brush, and
   (h) a debris receptacle carried on said sweeper positioned to receive debris lifted by said brush.

2. The sweeper of claim 1, wherein said vehicle attaching means includes a brace extending between said frames with a pair of attaching arms secured thereto and connecting pins for attaching said sweeper to the body of the vehicle.

3. The sweeper of claim 2 wherein said pair of attaching arms are of adjustable length.

4. The sweeper of claim 1 wherein said drive means comprises a drive sprocket connected to one end of the drive axle, a brush sprocket carried on a similar end of the brush axle, and a drive chain around both said sprockets whereby rotation of the drive axle rotates the brush axle.

5. The sweeper of claim 1 wherein said drive means comprises a gear train connected to the same end of said drive axle and said brush axle.

6. The sweeper of claim 1 wherein said debris receptacle is pivotally carried on said sweeper at its sides to enable easy emptying.

7. The sweeper of claim 6 wherein said debris receptacle comprises an upper and a lower rearwardly extending U-tube with web material extending between said tubes, and a bottom affixed to the lower U-tube, said upper U-tube being pivotally carried on said sweeper and a receptacle emptying rope extending from the bight of said upper U-tube to the vehicle to which said sweeper is attached whereby upon pulling said rope said receptacle is inverted to empty same.

References Cited
UNITED STATES PATENTS

| | | | |
|---|---|---|---|
| 2,670,486 | 3/1954 | Daniell | 15—79 |
| 2,994,896 | 8/1961 | Lopes | 15—82 |
| 3,101,498 | 8/1963 | Davlantes | 15—79 |

EDWARD L. ROBERTS, Primary Examiner

U.S. Cl. X.R.
56—27